US009503222B2

(12) United States Patent
Martin et al.

(10) Patent No.: US 9,503,222 B2
(45) Date of Patent: Nov. 22, 2016

(54) DIFFERENTIAL FORMATTING BETWEEN NORMAL AND RETRY DATA TRANSMISSION

(71) Applicant: Arteris SAS, Guyancourt (FR)

(72) Inventors: Philippe Martin, La Colle sur Loup (FR); Jonah Probell, Alviso, CA (US); Jean-Jacques Lecler, Sunnyvale, CA (US)

(73) Assignee: Qualcomm Technologies, Inc., San Diego, CA (US)

( * ) Notice: Subject to any disclaimer, the term of this patent is extended or adjusted under 35 U.S.C. 154(b) by 0 days.

(21) Appl. No.: 13/708,715

(22) Filed: Dec. 7, 2012

(65) Prior Publication Data

US 2014/0136916 A1    May 15, 2014

Related U.S. Application Data

(60) Provisional application No. 61/630,391, filed on Dec. 8, 2011.

(51) Int. Cl.
*H04L 1/00*       (2006.01)
*G06F 11/08*     (2006.01)
(Continued)

(52) U.S. Cl.
CPC ............ *H04L 1/1809* (2013.01); *H04L 1/0061* (2013.01)

(58) Field of Classification Search
CPC ............. H04L 1/0061; H04L 43/0829; H04L 43/0823; H04L 69/324; H04L 1/1809; H04L 1/0025; H04L 12/4013; H04L 1/0005; H04L 1/0006; H04L 1/0072; G06F 11/00; H04N 21/234327; H04N 21/631; H04N 21/6379; H04N 21/6583; H04Q 2213/13166; H04Q 2213/13174; H04Q 2213/13204; H04Q 2213/13215; H04Q 2213/13216
USPC ............ 714/758, 48, 748, E11.03, 749, 752, 714/746, E11.021, E11.001; 375/E7.091, 375/295, 316
See application file for complete search history.

(56) References Cited

U.S. PATENT DOCUMENTS 5,594,732 A * 1/1997 Bell ..................... H04L 12/413
                                                              370/401
5,623,605 A * 4/1997 Keshav ............... H04L 12/2856
                                                              370/392

(Continued)

FOREIGN PATENT DOCUMENTS

EP       1892874 A2    2/2008
JP       H09214507 A   8/1997

(Continued)

OTHER PUBLICATIONS

Shuler, "Arteris Connected Blog [online]", URL: http//info.arteris.com/blog/bid/57861/TI-omAP-5-Platform-includes-MIPI-LLI-and-C2C-interchip-connectivity, Mar. 4, 2011.

(Continued)

*Primary Examiner* — Phung M Chung
(74) *Attorney, Agent, or Firm* — Muncy, Geissler, Olds & Lowe, P.C.

(57) ABSTRACT

A first frame and a second frame are combined into an extended frame. The extended frame is encapsulated and transmitted over a channel as an extended physical digital. A transmission error notification is received, indicating error in a reception of the transmitted extended physical digital. In response, a re-transmission encapsulates the first frame into a first physical digit, transmits the first physical digit over the channel, encapsulates the second frame into a second physical digit, and transmits the second physical digit over the channel.

17 Claims, 7 Drawing Sheets

(51) Int. Cl.
  *H03M 13/00*    (2006.01)
  *H03M 13/25*    (2006.01)
  *H04N 7/173*    (2011.01)
  *H04L 1/18*     (2006.01)

(56) References Cited

U.S. PATENT DOCUMENTS

| | | | | |
|---|---|---|---|---|
| 5,991,308 | A * | 11/1999 | Fuhrmann et al. | 370/395.53 |
| 6,301,249 | B1 * | 10/2001 | Mansfield et al. | 370/394 |
| 7,313,712 | B2 * | 12/2007 | Cherukuri | G06F 1/3209 |
| | | | | 713/300 |
| 7,436,834 | B1 | 10/2008 | Zhang et al. | |
| 7,610,500 | B2 * | 10/2009 | Cherukuri | G06F 1/3209 |
| | | | | 370/235 |
| 8,059,664 | B2 * | 11/2011 | Wilson | H04L 45/00 |
| | | | | 370/401 |
| 8,321,734 | B2 * | 11/2012 | Kwon et al. | 714/748 |
| 8,402,343 | B2 * | 3/2013 | Radulescu | 714/758 |
| 8,522,104 | B2 * | 8/2013 | Martin et al. | 714/748 |
| 8,532,119 | B2 * | 9/2013 | Snively | H04L 45/00 |
| | | | | 370/389 |
| 8,806,551 | B2 * | 8/2014 | Haimi-Cohen | 725/109 |
| 8,958,325 | B2 * | 2/2015 | Opavsky et al. | 370/252 |
| 2002/0116566 | A1 | 8/2002 | Saida | |
| 2003/0112759 | A1 | 6/2003 | Zhang et al. | |
| 2004/0163024 | A1 * | 8/2004 | Kawai et al. | 714/748 |
| 2005/0114489 | A1 | 5/2005 | Yonge, III | |
| 2005/0207392 | A1 * | 9/2005 | Sivalingham et al. | 370/349 |
| 2005/0259599 | A1 | 11/2005 | Cherukuri | |
| 2006/0146934 | A1 * | 7/2006 | Caglar et al. | 375/240.12 |
| 2007/0124532 | A1 | 5/2007 | Bennett et al. | |
| 2007/0140259 | A1 | 6/2007 | Mouffron et al. | |
| 2007/0226596 | A1 | 9/2007 | Safranek et al. | |
| 2008/0075107 | A1 * | 3/2008 | Cherukuri | G06F 1/3209 |
| | | | | 370/447 |
| 2008/0077814 | A1 * | 3/2008 | Cherukuri | G06F 1/3209 |
| | | | | 713/320 |
| 2008/0133996 | A1 | 6/2008 | Naka et al. | |
| 2008/0195912 | A1 | 8/2008 | Mende et al. | |
| 2008/0273554 | A1 | 11/2008 | Shao et al. | |
| 2008/0285562 | A1 | 11/2008 | Scott et al. | |
| 2010/0050041 | A1 | 2/2010 | Chang et al. | |
| 2010/0275097 | A1 * | 10/2010 | Choi et al. | 714/758 |
| 2012/0030385 | A1 * | 2/2012 | Yoshimura | G06F 13/385 |
| | | | | 710/52 |

FOREIGN PATENT DOCUMENTS

| | | |
|---|---|---|
| JP | 2000503498 A | 3/2000 |
| JP | 2002521936 A | 7/2002 |
| JP | 2006191279 A | 7/2006 |
| WO | 9731446 A1 | 8/1997 |
| WO | 0005911 A1 | 2/2000 |

OTHER PUBLICATIONS

Supplementary European Search Report—EP12854899—Search Authority—The Hague—May 8, 2015.

Shuler, Kurt, "Interchip Connectivity; HSIC UniPro, HSI, C2C, LLI . . . oh my!" Arteris Connected Blog, Mar. 31, 2011, 2 pages.

* cited by examiner

DIFFERENTIAL FORMATTING BETWEEN NORMAL AND RETRY DATA TRANSMISSION

CROSS-REFERENCE

The present application claims priority to U.S. Provisional Application Ser. No. 61/630,391 filed on Dec. 8, 2011 and titled DIFFERENTIAL FORMATTING BETWEEN NORMAL AND RETRY DATA TRANSMISSION, the entire disclosure of which is incorporated herein by reference.

FIELD OF THE INVENTION

The disclosed invention pertains to computers and, more specifically, to protocols for data transmission between chips; in particular, protocols that use error detection and retransmission of data received erroneously.

BACKGROUND

This invention was conceived in the context of the Mobile Industry Processor Interface (MIPI) Alliance Low Latency Interface (LLI) working group. The LLI interface protocol standard is designed to achieve low latency communication between chips. LLI comprises a data link layer (DL) and physical adaptation layer (PA). LLI provides DL lossless error transmission over a lossy physical communication channel. LLI ensures correct data transmission by using error detection and a scheme of the transmitter resending data when the receiver detects an error and signals a transmission error notification (NACK). The scheme is described in U.S. Pat. No. 8,522,104, titled "Smart Aging Retry Buffer," issued Aug. 27, 2013, and MIPI Alliance Specification for Low Latency Interface (LLI) Version 1.0.

LLI transmitted atomic data units (PHITs) are small in order to improve latency, but this implies that the protection information is a significant throughput and power consumption overhead. An improved protocol can use longer atomic data units for data that is less latency-sensitive.

In an improved protocol, multiple DL frames are losslessly compressed into an extended PHIT (ePHIT) if they comprise certain redundancy, such as they belong to the same channel, they are of the same type, or they have the same transaction ID field. In one embodiment, single DL frames can be taken to which frame sequence number and cyclic redundancy check (CRCs) fields are appended to form PHITs. Alternatively, groups of four DL frames can be compressed. Sequence numbers and CRC fields are appended to form ePHITs. Whether frames are combined and transmitted as ePHITs or transmitted as separate PHITs depends on the properties of the frames. When frames are combined into ePHITs, they carry the same DL data as four PHITs but with less overhead. That results in greater data throughput. In one embodiment the throughput improvement is 25%. Frame combining is the more common case with normal traffic patterns.

This scheme creates big problems. Compared to a retry buffer that holds only PHITs a retry buffer that holds both PHITs and ePHITs is more complex. It requires more buffering because more time is necessary for receivers to detect CRC errors in ePHITs since they are longer. If the retry buffer is organized for standard PHIT width, storing ePHIT entries requires multiple PHIT entries and the control becomes very complex, if organized in ePHITs then the datapath is very large and storage of regular PHITs is sub-optimal.

Because ePHITs are longer than PHITs the DL error rate is significantly higher for ePHITs than for a sequence of PHITs. Furthermore, the CRC mechanism to support ePHITs is not backward compatible with transmitter retry buffers that do not support ePHITs.

SUMMARY OF THE INVENTION

The disclosed invention stores only PHITs in the retry buffer. This requires no change to prior art retry buffer design. Retry reliability is fully preserved. Furthermore, the use of the prior art CRC format for normal PHITs is backward compatible. This is achieved by using a prior art retry mechanism and retrying the transmission of the frames of errant ePHITs as PHITs. Furthermore, to reduce the number of bits required to provide sequence number and sufficient CRC protection, the sequence numbers of ePHITs are hashed with ePHIT CRCs, such as by using a simple exclusive or function (XOR), to form physical adaptation (PA) layer CRCs that are appended to the compressed DL frames. The loss of compression as a result of sending retries as separate PHITs instead of compressed ePHITs is inconsequential from a performance perspective because retry is a rare event.

DETAILED DESCRIPTION

Figure 1:
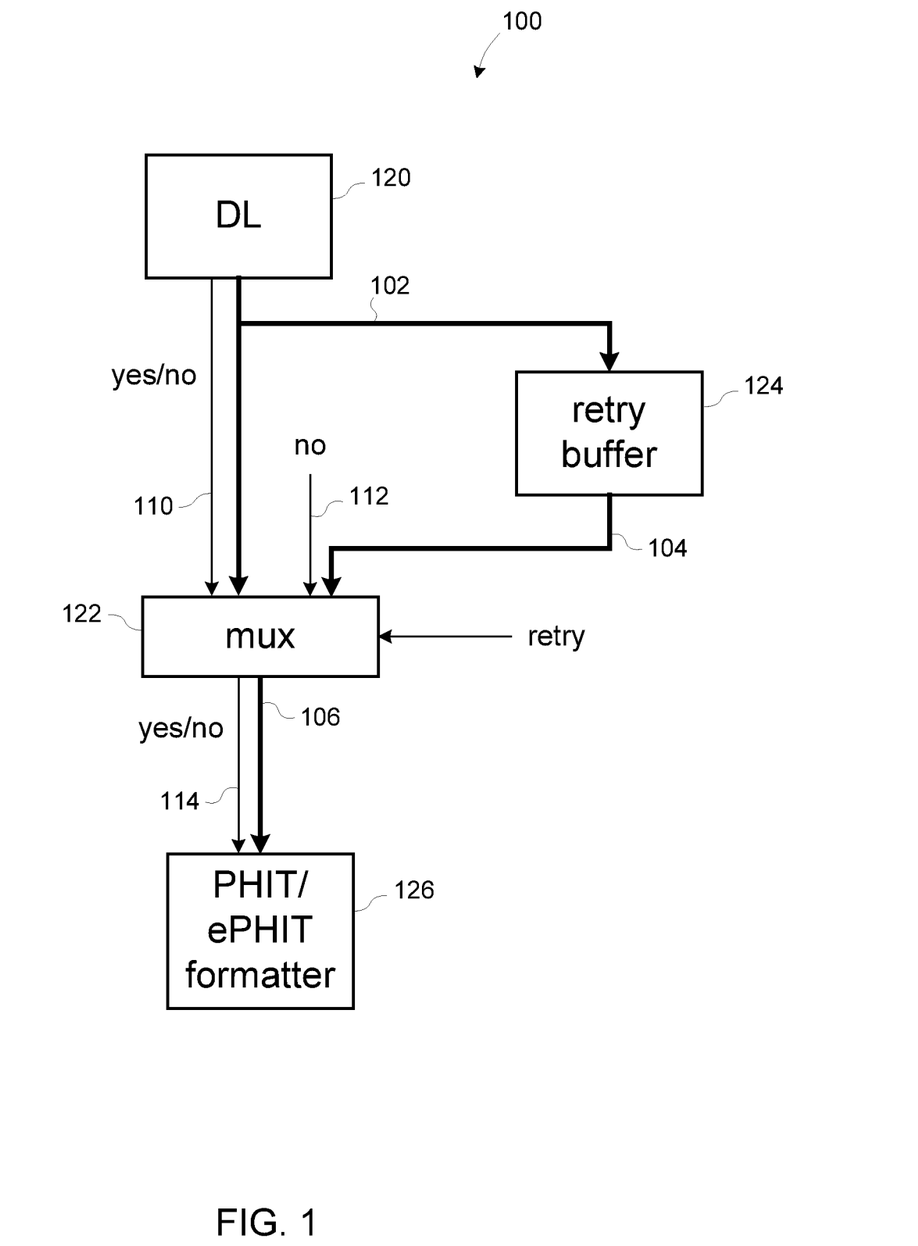
FIG. 1 illustrates a transmitter for transmitting PHITs and ePHITs in accordance with the teachings of the present invention.

One embodiment of a transmitter, according to an aspect of the present invention, is depicted in FIG. 1. In a transmitter 100, DL logic 120 indicates with signal 110, for each data frame, whether it is combinable. Frame data is transferred on bus 102 to mux 122 and retry buffer 124 where it is stored for some time. Mux 122 transfers data on bus 106 to PHIT/ePHIT formatter 126. Parallel signal 114 indicates whether each frame is to be combined with others into an ePHIT or else sent individually in a PHIT. When a transmission error notification is signaled, mux 122 switches to select its frame input from the retry buffer 124 on bus 104. The retry buffer stores only information necessary for sending frames as PHITs. As a result, all frames read into mux 122 on input bus 104 are indicated as not combinable by signal 112.

Figure 2:
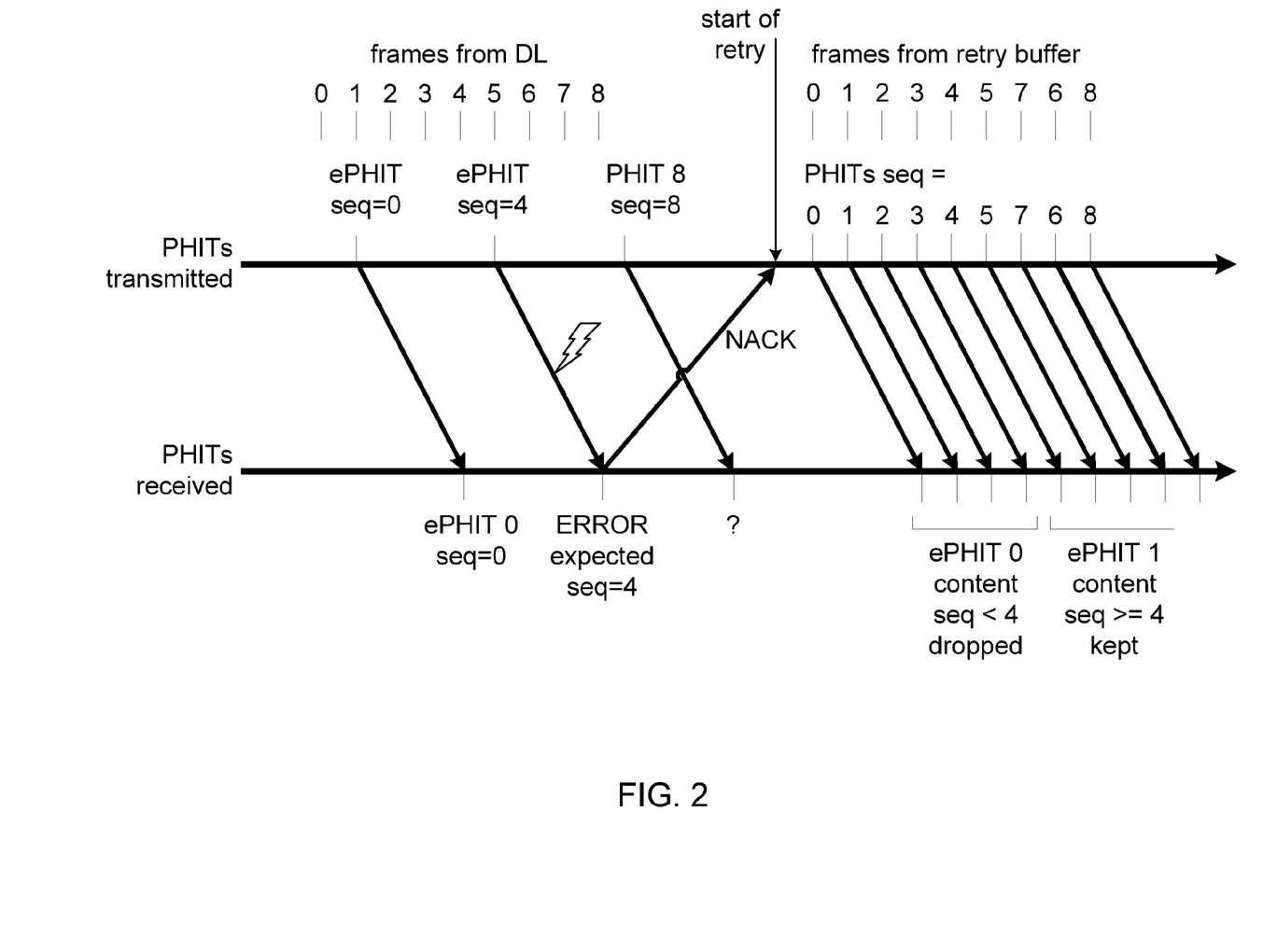
FIG. 2 is a timeline illustrating a transmission and retry transmission of two ePHITs and one PHIT where an error is detected on the second ePHIT in accordance with the teachings of the present invention.

According to one aspect of the present invention, the timeline of a transmission and retry sequence is shown in FIG. 2. A sequence of 9 DL frames is sent. Frames 0-3 are formatted as an ePHIT to be decoded with an expected sequence number of 0 and transmitted. Frames 4-7 are formatted as an ePHIT to be decoded with an expected sequence number of 4 and transmitted. Frame 8 is formatted as a PHIT with sequence number field 8 and transmitted.

The first ePHIT is received and decoded with no error detected. The second ePHIT incurs corruption and it fails the ePHIT CRC check in the receiver. The receiver signals NACK to the transmitter. The PHIT with sequence number 8 is received and discarded since its sequence number is greater than that of the expected sequence number that failed.

Figure 5:
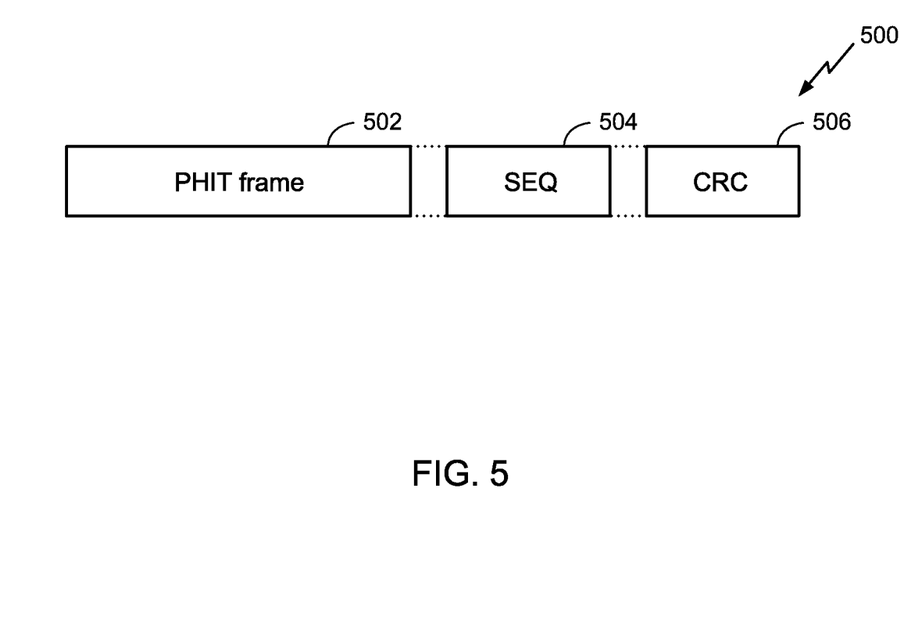
FIG. 5 illustrates the format of a PHIT in accordance with the teachings of the present invention.

The NACK signal is eventually received by the transmitter, at which time the transmitter starts its retry sequence. Every frame stored in the retry buffer is retransmitted as a non-combinable frame. As a result, each is formatted and sent as a unique PHIT. FIG. 5 illustrates the format of a PHIT 500 in accordance with the teachings of the present invention, comprising a PHIT frame field 502 sequence number field 504, and CRC field 506. When the PHITs of retransmitted frames are received, those with a sequence number field having a sequence number less than 4 are discarded by the receiver, it having already received them correctly. Those with a sequence number greater than or equal to 4 are decoded and passed to the receiver data link module.

The sequence number is used by the receiver to differentiate, in case retry data is received, between frames that were already successfully received and frames that were not. If an ePHIT would increase the sequence number by 1, the protocol would not work because the numbering would differ between the retry and the original transmission. The invention increases sequence number for each ePHIT by the number of frames encoded in the ePHIT (four in this embodiment). Thereby, the sequence numbering is consistent.

This invention is superior to one in which the formatter lets the retried frames be combined into ePHITs in part because:
1. There is no need to store the information within the retry buffer scheme that PHITs are combinable.
2. There is no need to make sure that if 4 frames are combinable, they are ALL stored and evicted atomically from the retry buffer.
3. Future protocol enhancement that perform new methods of compressing frames into differently formatted varieties of PHITs will further have no need to update the retry buffer scheme.

Figure 3:
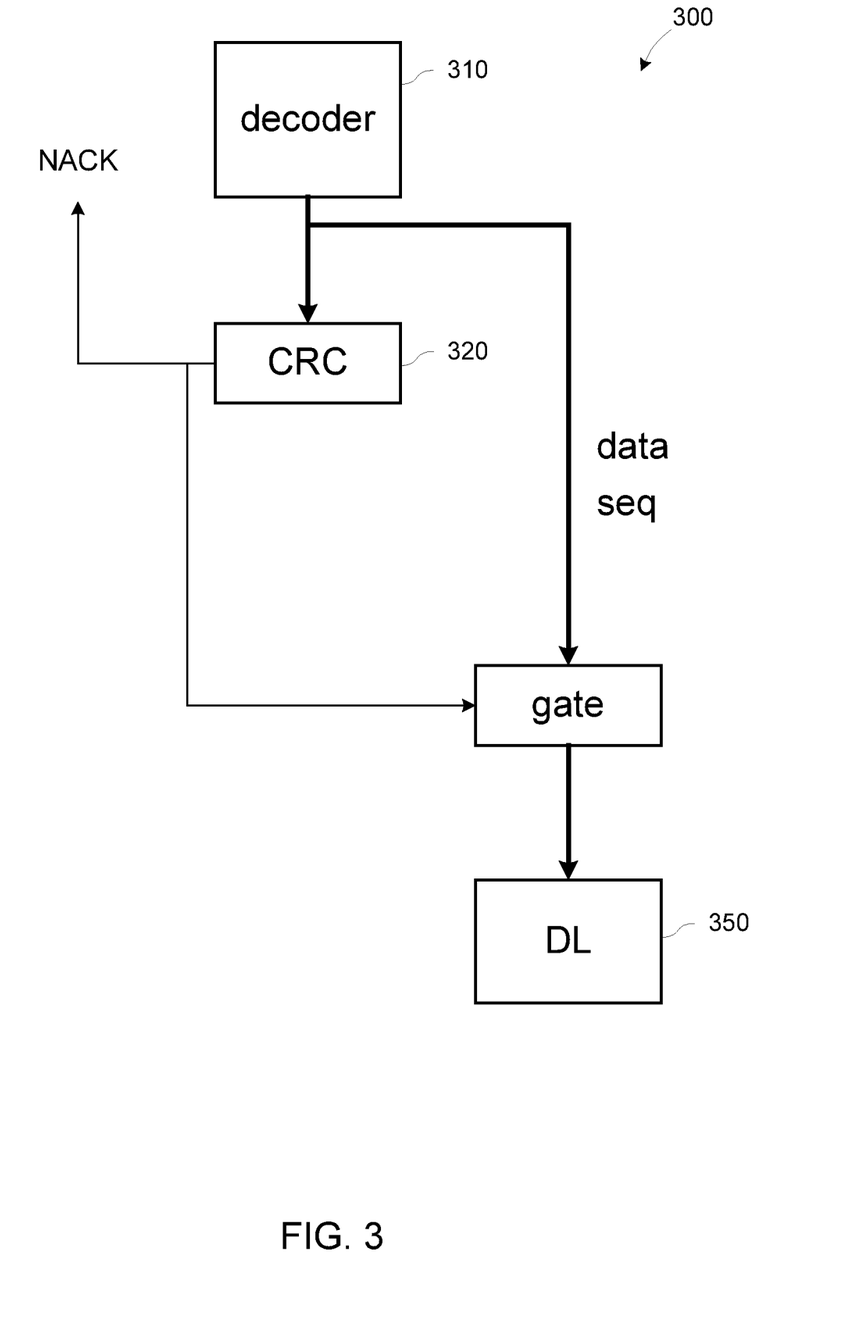
FIG. 3 illustrates a receiver for receiving PHITs in accordance with the teachings of the present invention.

FIG. 3 shows a receiver for PHITs 300. PHIT decoder 310 extracts DL frame data and sequence numbers from PHITs and forwards them to DL logic 350. The decoder outputs the CRC field, which is used by CRC logic 320 to determine whether to assert a NACK signal.

Figure 4:
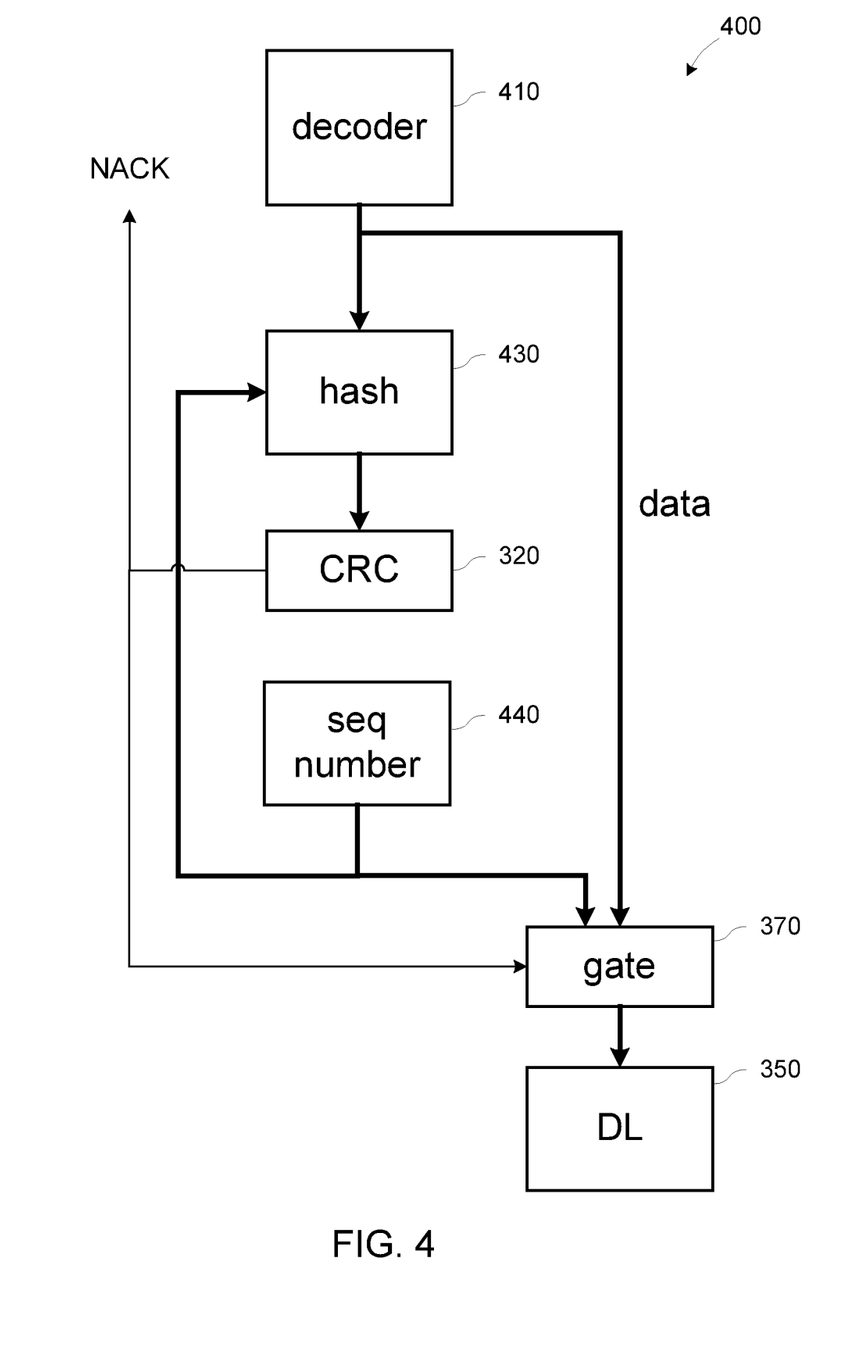
FIG. 4 illustrates a receiver capable of receiving ePHITs in accordance with the teachings of the present invention.

FIG. 4 shows a receiver for ePHITs 400. According to an aspect of the invention, ePHIT decoder 410 extracts DL frame data from ePHITs and forwards it to DL logic 350. ePHIT decoder 410 forwards the PA CRC to hash module 430. Sequence number generator 440 indicates the next expected sequence number to a gate 370 and then to DL logic 350 and hash module 430. Hash module 430 hashes the value of the next expected sequence number with the PA CRC using an XOR function to produce an ePHIT CRC. The ePHIT CRC is used by CRC module 320 to determine whether to assert a NACK signal.

Figure 6:
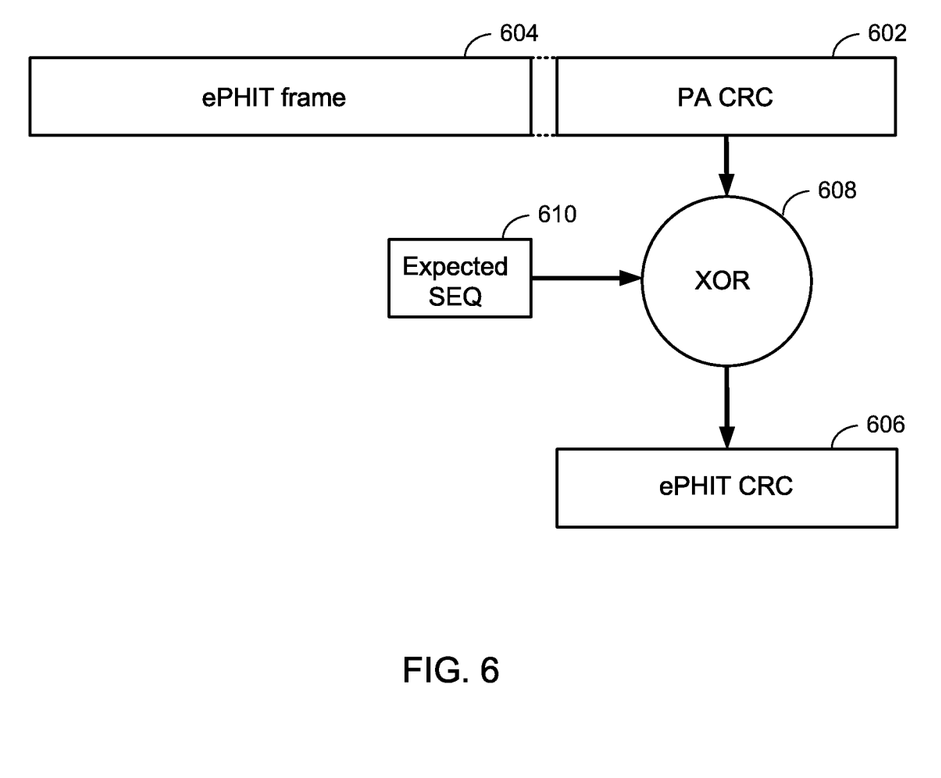
FIG. 6 illustrates the transformation of the PA CRC of an ePHIT into an ePHIT CRC in accordance with the teachings of the present invention.

In this embodiment, an ePHIT requires more CRC information than a PHIT to be sufficiently protected by error detection. This leaves too few bits in an ePHIT format to encode a sequence number. This is solved, according to an aspect of the invention, by applying a logical XOR function of the CRC and the sequence number. FIG. 6 illustrates this transformation of the PA CRC 602 of an ePHIT 604 into an ePHIT CRC 606, by applying a logical XOR function 608 of the PA CRC 602 and the sequence number 610 in accordance with the teachings of the present invention. This allows the use of a PA layer CRC to format a frame into an ePHIT.

In normal operation there is no disadvantage to using an XOR hash function of the sequence number with the CRC. The receiver knows the expected sequence number based on the sequence number of the previously correctly received PHIT or ePHIT. The receiver applies a corresponding XOR hash function with its expected sequence number to the PA layer CRC of the received PHIT before testing the resulting ePHIT CRC against the frame. If the CRC test is good, then the ePHIT is good. If this CRC test is bad, then the receiver can not know if it is the sequence number or the CRC that is erroneous. In either case the ePHIT is deemed erroneous, NACK is signaled, and retry is initiated.

During a retry the transmitter may resend data that was already properly received, as depicted in FIG. 2. The receiver must drop any retried frames that were already correctly received. This means dropping any frames with a sequence number less than that of the expected sequence number for which an error was detected. The receiver does not know which DL frames will be resent. In the case depicted in FIG. 2 the DL frames from the ePHIT with expected sequence number 0 are resent, even though they were already properly received. To know which DL frames are resent, the receiver must be able to extract the sequence number directly, without relying on an expected sequence number. This means that resent frames must be resent as PHITs, not ePHITs. Because ePHITs have hashed sequence numbers, the actual sequence numbers can only be accurately extracted from PHITs.

If a CRC is bad then there has been an error during the retry itself, and that retry must be retried (recursive retry is supported by the LLI protocol). During a retry, the CRC and sequence number can not be hashed because it makes the differentiation of a CRC error from a sequence number error impossible. Hence, this is another benefit to using PHITs to retry frames that were previously formatted and sent as ePHITs.

Figure 7:
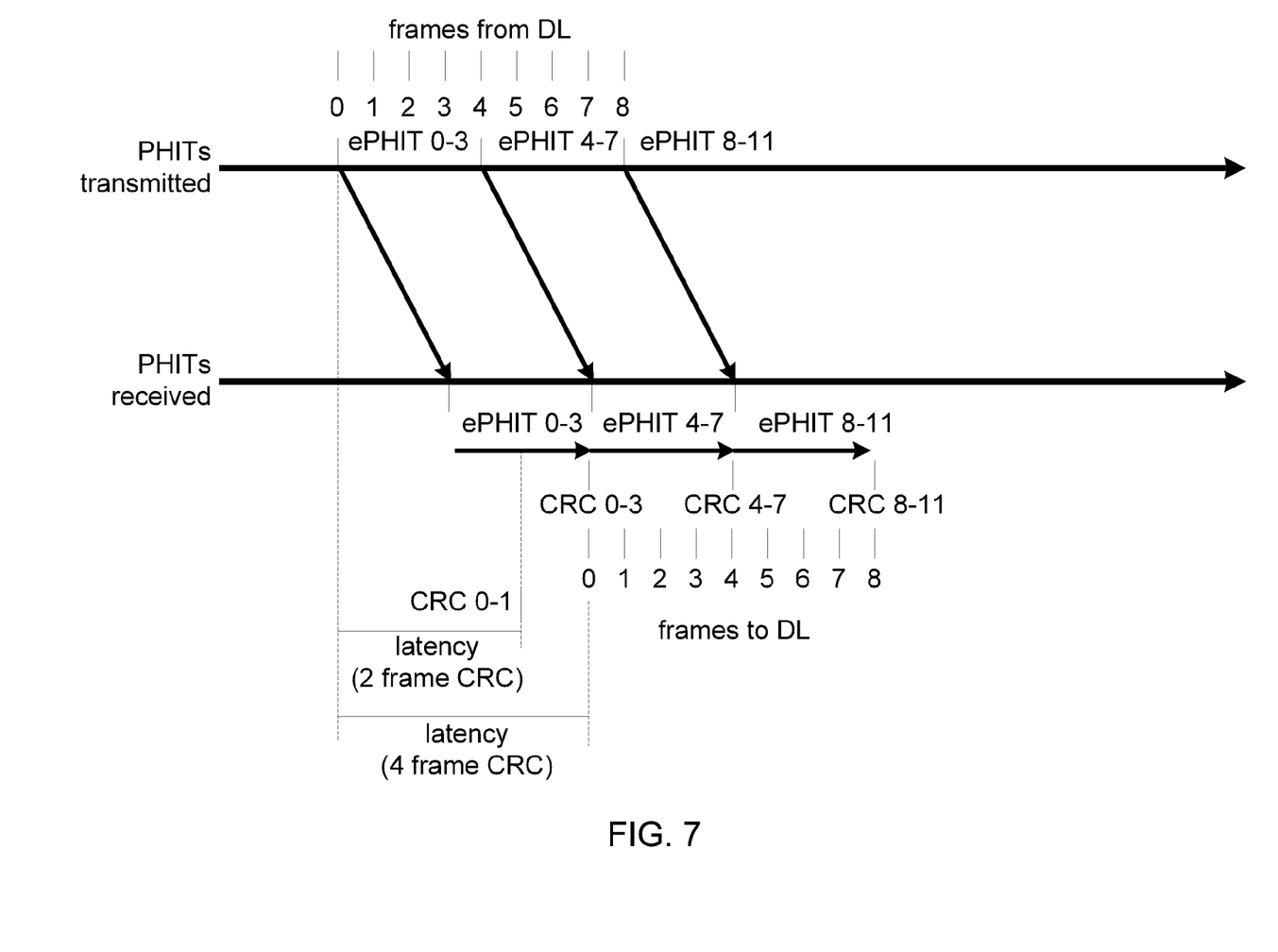
FIG. 7 illustrates applying CRC to a portion of ePHITs, enabling decoding by the receiver and sending to a downstream DL earlier than if the CRC is applied to the full ePHIT.

One result of simply adding a CRC to ePHITs is that the receiver must receive the full ePHIT and check the CRC before sending the first frame from the ePHIT to the downstream DL. Because ePHITs are longer than PHITs, that means that ePHITs have higher latency. As illustrated by FIG. 7, if CRC is applied to a portion of each ePHIT then that portion can be decoded by the receiver and sent to the downstream DL earlier than if the CRC is applied to the full ePHIT. According to a further aspect of the invention, CRC is applied to a portion of the ePHIT that contains all of the redundant DL information, plus the unique information of the first frame. This allows minimum latency for the first frame of the ePHIT. The remainder of the ePHIT can have CRCs applied with a single code for each quantity of data comprising a single frame or portions of the ePHIT in regular size quantities can have CRCs applied.

The various aspects of the present invention may be implemented in software, hardware, application logic, or a combination of software, hardware, and application logic. The software, application logic and/or hardware may reside on a server, an electronic device, or a service. If desired, part of the software, application logic and/or hardware may reside on an electronic device, part of the software, application logic and/or hardware may reside on a server.

While the present invention has been described with reference to the specific applications thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

The foregoing disclosures and statements are illustrative only of the present invention, and are not intended to limit or define the scope of the present invention. The above description is intended to be illustrative, and not restrictive. Although the examples given include many specificities, they are intended as illustrative of only certain possible applications of the present invention. The examples given should only be interpreted as illustrations of some of the applications of the present invention, and the full scope of the present invention should be determined by the appended claims and their legal equivalents. Those skilled in the art will appreciate that various adaptations and modifications of the just-described applications can be configured without departing from the scope and spirit of the present invention. Therefore, it is to be understood that the present invention may be practiced other than as specifically described herein. The scope of the present invention as disclosed and claimed should, therefore, be determined with reference to the knowledge of one skilled in the art and in light of the disclosures presented above.

Although various aspects of the present invention are set out in the independent claims, other aspects of the invention comprise any combination of the features from the described embodiments and/or the dependent claims with the features of the independent claims, and not the solely the combination explicitly set out in the claims.

Unless defined otherwise, all technical and scientific terms used herein have the same meaning as commonly understood by one of ordinary skill in the art to which this invention belongs. Any methods and materials similar or equivalent to those described herein can also be used in the practice or testing of the present invention.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

What is claimed is:

1. A method of transmitting frames of data over an interface between chips, the method comprising:
    combining a first frame and a second frame into an extended frame;
    inputting the first frame and the second frame into a retry buffer and storing the first frame and the second frame in the retry buffer, as respectively separate frames;
    encapsulating the extended frame into an extended data unit, the extended data unit being formatted for transmission, and transmitting the extended data unit, while maintaining the first frame and the second frame in the retry buffer as respectively separate frames, wherein the extended data unit includes an information, the information comprising a cyclical redundancy check (CRC) data for the extended data unit, hashed with a sequence number of the extended data unit;
    receiving a transmission error notification representing the extended data unit being an erroneously transmitted extended data unit;
    in response to the transmission error notification retransmitting as respective separate data units of the first frame and the second frame, the retransmitting comprising:
        receiving from the retry buffer the first frame, encapsulating the first frame as a first data unit and transmitting the first data unit; and
        receiving from the retry buffer the second frame, encapsulating the second frame as a second data unit and transmitting the second data unit.

2. The method of claim 1, wherein transmitting the extended data unit is according to Mobile Industry Processor Interface Alliance (MIN) Low Latency Interface (LLI) protocol.

3. The method of claim 1, wherein combining the first frame and the second frame into the extended frame comprises lossless compression.

4. The method of claim 1, wherein combining the first frame and the second frame into the extended frame comprises:
    receiving the first frame and the second frame with a corresponding signal that indicates whether the first frame and the second frame can be combined; and
    based at least in part on a logical YES value of the corresponding signal, combining the first frame and the second frame into the extended frame and, based at least in part on a logical NO value of the corresponding signal, not combining the first frame and the second frame into the extended frame.

5. The method of claim 1,
    wherein encapsulating the first frame as the first data unit includes with the first data unit a first sequence number, the first sequence number being greater than or equal to the sequence number of the extended data unit, and
    wherein encapsulating the second frame as the second data unit includes with the second data unit a second sequence number, the second sequence number being different than the first sequence number and greater than or equal to the sequence number of the encapsulated data unit.

6. A transmitter for sending frames of data over an interface between chips and capable of receiving a transmission error notification, the transmitter comprising:
    an input port for receiving a first frame and a second frame;
    a retry buffer that stores at least the first frame and the second frame from the input port;

a formatter having a formatter input; and
a multiplexer configured to selectively provide to the formatter input the first frame and the second frame from the input port and, in response to receiving a transmission error notification from a receiver, to provide to the formatter input the first frame and the second frame from the retry buffer,
the formatter being configured
to combine, based at least in part on receiving the first frame and the second frame from the input port, the first frame and the second frame into an extended frame and to encapsulate and format the extended frame into an extended data unit, formatted for transmission by the transmitter, and to include in the extended data unit an information, the information comprising a sequence number of the extended data unit hashed with a cyclical redundancy check (CRC) information for the extended data unit, and
upon receiving the first frame and the second frame from the retry buffer, to encapsulate the first frame into a first data unit, formatted for transmission by the transmitter, and to encapsulate the second frame into a second data unit, formatted for transmission by the transmitter.

7. The transmitter of claim 6, the formatter being configured to format the extended data unit, format the first data unit, and format the second data unit PHIT, and to transmit the extended data unit, according to Mobile Industry Processor Interface Alliance (MIPI) Low Latency Interface (LLI) protocol.

8. The transmitter of claim 6, the formatter being configured to combine the first frame and the second frame into the extended frame according to a lossless compression.

9. The transmitter of claim 6, the input port being configured to receive, in association with the first frame and the second frame, corresponding signals that indicate the first frame and the second frame can be combined,
the multiplexer being configured to provide to the formatter input, from the input port, the first frame, the second frame, and the corresponding signals that indicate the first frame and the second frame can be combined, and
the retry buffer being configured to store the first frame and the second frame without the corresponding signals that indicate the first frame and the second frame can be combined.

10. The transmitter of claim 6 the formatter being further configured to:
append the first frame in the first data unit with a first sequence number, the first sequence number being greater than or equal to the sequence number of the extended data unit, and
append the second frame in the second data unit with a second sequence number that is different from the first sequence number and is greater than or equal to the sequence number of the extended data unit.

11. A method of receiving frames of data over an interface between chips, a receiver detecting error in the data and, in response, sending over the interface a request for re-transmission, the method comprising:
receiving, at the receiver, over the interface, a data unit, the data unit including a sequence number, and assigning the sequence number as a preceding sequence number;
receiving, at the receiver, over the interface, an extended data unit, the extended data unit comprising at least a first frame data and a second frame data, and including a physical layer (PA) cyclic redundancy check (CRC) data hashed with a sequence number of the extended data unit;
extracting, by the receiver, a receiver extracted PA CRC data from the extended data unit;
determining, at the receiver, an expected sequence number for the extended data unit, the determining based at least in part on the preceding sequence number;
hashing, at the receiver, the receiver-extracted PA CRC data with the expected sequence number for the extended data unit and producing, as a result, an extended data unit CRC;
detecting at the receiver, based on the extended data unit CRC, whether there is a transmission error in the extended data unit; and
upon detecting the transmission error in the extended data unit, the receiver sending a transmission error notification toward a transmitter of the extended data unit.

12. The method of claim 11, wherein receiving the extended data unit is according to Mobile Industry Processor Interface Alliance (MIPI) Low Latency Interface (LLI) protocol.

13. The method of claim 11, the determining at the receiver the expected sequence number being performed by a receiver sequence generator.

14. The method of claim 11, the hashing at the receiver of the receiver-extracted PA CRC data with the expected sequence number of the extended data unit being performed by a hash module of the receiver.

15. A receiver for receiving frames of data over an interface between chips, the receiver comprising:
a data unit decoder, configured to receive a data unit, the data unit encapsulating a frame of data, the data unit including a sequence number, and configured to extract the sequence number and to assign the sequence number as a preceding sequence number;
an extended data unit decoder, configured to receive an extended data unit, the extended data unit encapsulating a plurality of frames of data and, based on the frames of data in the extended data unit, output a receiver extracted physical adaptation layer (PA) cyclic redundancy check (CRC) data;
a generator configured to output an expected sequence number of the extended data unit, based at least in part on the preceding sequence number;
a hash module, configured to receive from the extended data unit decoder the receiver extracted PA CRC data, and to receive from the generator the expected sequence number of the extended data unit,
wherein the hash module is configured to hash the receiver extracted PA CRC data with the expected sequence number of the extended data unit to produce an extended data unit CRC; and
an error detection module, configured to determine, in response to the extended data unit CRC not matching the receiver extracted PA CRC data that the extended data unit has error.

16. The receiver of claim 15, wherein the extended data unit decoder is configured to decode the extended data unit that are formatted according to Mobile Industry Processor Interface Alliance (MIPI) Low Latency Interface (LLI) protocol.

17. The receiver of claim 15, wherein the extended data unit decoder is configured to decompress the first frame and the second frame in the extended data unit.

* * * * *